United States Patent
Midmore (12)

(10) Patent No.: US 9,576,319 B2
(45) Date of Patent: *Feb. 21, 2017

(54) METHODS AND SYSTEMS OF FOUR-VALUED MONTE CARLO SIMULATION FOR FINANCIAL MODELING

(71) Applicant: Roger Midmore, San Francisco, CA (US)

(72) Inventor: Roger Midmore, San Francisco, CA (US)

(*) Notice: Subject to any disclaimer, the term of this patent is extended or adjusted under 35 U.S.C. 154(b) by 240 days.

This patent is subject to a terminal disclaimer.

(21) Appl. No.: 14/051,722

(22) Filed: Oct. 11, 2013

(65) Prior Publication Data

US 2015/0066730 A1 Mar. 5, 2015

Related U.S. Application Data (63) Continuation-in-part of application No. 14/016,518, filed on Sep. 3, 2013, and a continuation-in-part of application No. 14/016,538, filed on Sep. 3, 2013.

(51) Int. Cl.
| | |
|---|---|
| *G06N 7/00* | (2006.01) |
| *G06Q 40/04* | (2012.01) |
| *G06N 5/04* | (2006.01) |
| *G06N 5/02* | (2006.01) |

(52) U.S. Cl.
CPC ............. *G06Q 40/04* (2013.01); *G06N 5/04* (2013.01); *G06N 5/02* (2013.01)

(58) Field of Classification Search
None
See application file for complete search history.

(56) References Cited

U.S. PATENT DOCUMENTS

| | | |
|---|---|---|
| 5,692,233 A | 11/1997 | Garman |
| 2008/0221892 A1* | 9/2008 | Nathan et al. ............... 704/257 |
| 2011/0071958 A1* | 3/2011 | Grody et al. ............... 705/36 R |

(Continued)

OTHER PUBLICATIONS

"Algorithms for Paraconsistent Reasoning with OWL", Yue Ma, Pascal Hitzler, Zuoquan Lin, The Semantic Web: Research and Applications, Lecture Notes in Computer Science, vol. 4519, 2007, pp. 399-413.*

(Continued)

*Primary Examiner* — Stanley K Hill
*Assistant Examiner* — Mai T Tran
(74) *Attorney, Agent, or Firm* — West & Associates, A PC; Stuart West; Shaun Sluman (57) ABSTRACT

Automatic trading environments with their high degree of automation have become the backbone of modern financial markets. The ability to process orders and manage risk in these systems while maintaining a low latency between participants is crucial for the safety and liquidity of these markets. The disclosed system describes a four valued Monte Carlo simulation for the stochastic modeling of risk and syntactic pattern matching techniques to facilitate the design of these systems. The system is a self-compiling, machine independent system capable of dividing, scaling and communicating multiple-asset instruments efficiently in a parallel environment. The system also allows for the integration of computerized financial heuristics on financial instruments and user interfaces for creating trading strategies to monitor and hedge risk over a trading desk for financial institutions.

12 Claims, 6 Drawing Sheets

(56) References Cited

U.S. PATENT DOCUMENTS

| | | | | |
|---|---|---|---|---|
| 2011/0119047 | A1* | 5/2011 | Ylonen | 704/9 |
| 2013/0019230 | A1* | 1/2013 | Nakanishi et al. | 717/149 |

OTHER PUBLICATIONS

"High Performance Natural Language Processing on Semantic Network Array Processor", Hiroaki Kitano, Dan Moldovan, Seungho Cha, IJCAI, vol. 12, No. 1991, pp. 911-917, 1991.*

"An Overview of Rewrite Rule Laboratory (RRL)", Deepak Kapur, Hantao Zhang, Rewriting Techniques and Applications, Lecture Notes in Computer Science, vol. 355, 1989, pp. 559-563.*

"Semantic Network Array Processor as a Massively Paralllel Computing Platform for High Performance and Large-Scale Natural Language Processing", H. Kitano, D. Moldovan, COLING 1992 Proceedings of the 14th conference on Computational Linguistics, vol. 2, pp. 813-819.*

Englemore, R. and Tony Morgan. Blackboard Systems . . . Addisson Wesley Publishers. New York. 1988. pp. 475-490.

Halton, J. "A Retrospective and Prospective Survey of the Monte Carlo Method". University of Wisconsin Computer Science Tech Report #13. Feb. 1968.

Hays D., Bozena Henisz-Dostert and Marjorie Rapp (editor). "Annotated Bibliography of Rand Publications in Computational Linguistics". Rand Memorandum RM-3894-3. 1965. pp. 1.

Hays D., Marjorie Rapp, Boana Henisz-Dostert & Jean Houston (editors). "Bibliography of Computational Linguitics 1964". Rand Memorandum RM-4523-PR Mar. 1965. pp. 1-5.

Hays ., Marjorie Rapp, Boana Henisz-Dostert & Jean Houston (editors). "Bibliography of Computational Linguistics 1965". Rand Memorandum 4986-PR. Apr. 1966. pp. 1-5.

Hays D., M, Boana Henisz-Dostert & Jean Houston (editors). "Bibliography of Computational Linguistics 1966". Rand Memorandum RM-5345-PR. Apr. 1967. pp. 1-5.

Hays D., Boana Henisz-Dostert & Jean Houston (editors). "Bibliography of Computational Linguistics 1967". Rand Memorandum RM-5733-PR. Jul. 1968. pp. 1-5.

Hays D, Boana Henisz-Dostert, Jean Houston & Dolores Lofgren (editors). "Bibliography of Computational Linguistics 1968". Rand Memorandum RM-6233-PR. Jan. 1970. pp. 1-5.

Herdan G. The Advanced Theory of Language as Choice or Chance. Spring-Verlag. The Hague 1966. pp. 438-445.

Kleene S."Representation of Events in Nerve Nets and Finite Automata". Rand Memorandum RM-704. USA. Dec. 1951.

Kleene S. Introduction to Metamathematics. North Holland. USA. 1952. pp. 207, 317-337, 382, 536.

Kleene S. and Richard Vesley. The Foundations of Intuitionistic Mathematics Especially in Relation to Recursive Functions. North-Holland. USA. 1965. pp. 133-163.

Kleene S. Mathematical Logic. John Wiley. New York. 1967. pp. 176, 240-241.

Kleene S."Realizability: A Retrospective Survey". Cambridge Summer School in Mathematical Logic. Edited by Mathias, R. and H. Rogers. p. 95-112. 1973: p. 104.

Kleene S. "The Theory of Recursive Functions, Approaching Its Centennial". Bulletin of the American Mathematical Society. vol. 5, No. 1. USA. Jul. 1981. pp. 57-61.

Klein S. and Robert Simmons. "A Computational Approach to the Grammatical Encoding of English Words". Journal for the Association for Computing Machinery. vol. 10 N. 3. USA.

Klein S. and Robert Simmons. "Syntactic Dependence and the Computer Generation of Coherent Discourse". Mechanical Translation, vol. 7 No. 2. USA. Aug. 1963.

Klein S. "Automatic Paraphrasing in Essay Format". Mechanical Translation, vol. 8 N. 3&4. USA. Aug.-Dec. 1965.

Klein S. "Control of Style VVith a Generative Grammar". Language 41: 619-631. USA. 1965.

Klein S. "Historical Change in Language Using Monte Carlo Techniques". Mechanical Translation. 9: 619-631. USA. 1966.

Klein S., Stephen Lieman and Gary Lindstrom. "DISEMINER: A Distributional Semantics Inference Maker". Carnegie Mellon University Tech Report #1719. USA. 1966.

Klein S. "Current Research in the Computer Simulation of Historical Change in Language". University of Wisconsin Tech Report #6. USA. Aug. 1967.

Klein S., W. Febens, R. Herriott, W. Katke, M. Kupping & A. Towster. "The AUTOLING System". University of Wisconsin Tech Report #43. USA. Sep. 1968.

Klein S., M. Kuppins and K. Meives. "Monte Carlo Simulation of Language Change in Tikopia and Maori". University of Wisconsin Tech Report #62. USA. Jun. 1969.

Klein S. and Michael Kuppin. "An Interactive, Heuristic Program for Learning Transformational Grammars". University of Wisconsin Tech Report #97. USA. Aug. 1970.

Klein S., J. Oakley, D. Surballe and R. Ziesmer. A Program for Generating Reports on the Status and History of Stochastically Modifiable Semantic Models of Arbitrary Universe.

Klein S. and T. Dennison. "An Interactive Program for Learning the Morphology of Natural Languages". University of Wisconsin Tech Report #144. USA. Dec. 1971.

Klein S. "Automatic Inference of Semantic Deep Structure Rules in Generative Semantic Grammars." University of Wisconsin Tech Report #180. USA. May 1973.

Klein S., J. Aeschlimann, D. Balsiger, S. Converse, C. Court, M. Foster, R. Lao, J. Oakley and J. Smith. "Automatic Novel Writing: A Status Report". University of Wisconsin Te.

Klein S. and V. Rozencevj. "A Computer Model for the Ontogeny of Pidgin and Creole Languages". University of Wisconsin Tech Report #238. USA. Dec. 1974.

Klein S. "Computer Simulation of Language Contact Models". Toward Tomorrow's Linguistics. Edited by R. Shuy & C. J. Bailey. Georgetown University Press. USA. 1974.

Klein S. "Meta-Compiling Text Grammars as a Model for Human Behavior". University of Wisconsin Tech Report #252. USA. Apr. 1975.

Klein S., J. Aeschlimann, M. Appelbaum, D. Balsiger E. Curtis, M. Foster, D. Kalish, Y. Lee and L. Price. "FORWARD: The History of MESSY". University of Wisconsin Technical R.

Klein S., J. Aeschlimann, M. Appelbaum, D. Balsiger, E. Curtis, M. Foster, D. Kalish, Y. Lee and L. Price. Simulation D'Hypotheses Emises Par Propp & Levi-Strauss en Utilisan.

Klein S., D. Kaufer and C. Neuwirth. "The Locus of Metaphor in Frame Driven Text Grammar". University of Wisconsin Tech Report #366. USA. Sep. 1979.

Klein S. "Culture, Mysticism and Social Structure and the Calculation of Behavior". University of Wisconsin Technical Report #462. USA. 1981.

Klein S. "Analogy, Mysticism and the Structure of Culture". Current Anthropology. vol. 24 No. 2. USA. Apr. 1983. pp. 156-162.

Klein S. "The Invention of Computationally Plausible Knowledge Systems in the Upper Paleolithic". University of Wisconsin Tech Report #628. USA. Dec. 1985.

Klein S. "The Analogical Foundations of Creativity in Language, Culture & the Arts: the Upper Paleolithic to 2100 CE". Language, Vision & Music, edited by Paul McKevitt, Mulvi.

Lukasiewicz J. Aristotle's Syllogistic From the Standpoint of Modern Formal Logic. Oxford University Press. England. 1955. 2nd edition. pp. 158-173.

Siemens D. "On Klein's 'Analogy, Mysticism and the Structure of Culture'". Current Anthropology, vol. 29 No. 3. USA. Jun. 1988. pp. 472-478.

Steedman M. "Categorial Grammar". University of Pennsylvania Department of Computer and Information Science Technical Report No. MS-CIS-92-52. USA. 1992.

Troelstra A.S."From Constructivisrn to Computer Science". Theoretical Computer Science, No. 211, 1999. pp. 236-239.

Turing A. "Lecture to the London Mathematical Society on Feb. 20, 1947". Unpublished Manuscript. Alan Turing: His work and Impact. Edited by S. Cooper and Jan Leeuwen. Else.

Turing A. "Solvable and Unsolvable Problems". Alan Turing: His work and Impact. Edited by S. Cooper and Jan Leeuwen. Elsevier Science. United Kingdom. 2012. p. 331.

(56) References Cited

OTHER PUBLICATIONS

Yngve V. From Grammar to Science: New Foundations for General Linguistics. John Benjarnins Publishing. Amsterdam, 1996. pp. 47-63.
Belnap N., H. Leblanc & R. Thomason. "On Not Strengthening Intuitionistic Logic". Notre Dame Journal of Formal Logic, vol. 4 No. 4. USA. Oct. 1963.
Chretien D. "Review of the Calculus of Linguistic Observations". Language, vol. 4 No. 2. USA. 1965.
Midmore R. "An Interpretation of Sheldon Klein's Four Valued Analogical Transformational Operator". University of Wisconsin Technical Report #1801. USA. Feb. 2014.
Norvig P. and S. Russell. Artificial Intelligence: A Modern Approach. Pearson Education Inc. New Jersey, 2003. pp. 7-8.
Shapiro S. and R. Bechtel. "A Logic for Semantic Networks". University of Indiana Technical Report #47. USA. Mar. 1976.
Reichenbach H. The Theory of Probability. University of California Press. Berkeley and Los Angeles. USA. 1949. pp. xi, 387-401.
Lamport L. "Time, Clocks and the Ordering of Events in a Distributed System". Communications of the ACM. vol. 21 No. 7. USA. 1978.
Hull J. Options, Futures & Other Derivatives. Prentice Hall, New Jersey. Fifth Edition. 2003. p. 410.

* cited by examiner

Fig. 1

| ¬ | |
|---|---|
| F | T |
| T | F |
| U | U |
| D | D |

(Negation)

| ∧ | F | T | U | D |
|---|---|---|---|---|
| F | F | F | F | F |
| T | F | T | U | D |
| U | F | U | U | F |
| D | F | D | F | D |

(Conjunction)

| ∨ | F | T | U | D |
|---|---|---|---|---|
| F | F | T | U | D |
| T | T | T | T | T |
| U | U | T | U | T |
| D | D | T | T | D |

(Disjunction)

Logical Connectives

Fig. 2

Fig. 3   Semantic Network

Fig. 4

Diagram of the arrays (with size = N)
associated with each Semantic Node

METHODS AND SYSTEMS OF FOUR-VALUED MONTE CARLO SIMULATION FOR FINANCIAL MODELING

CROSS REFERENCE TO RELATED APPLICATIONS

This application is a continuation in part to U.S. patent application(s) Ser. No. 14/016,518 filed on Sep. 3, 2013 and Ser. No. 14/016,538 file on Sep. 3, 2013, the contents of which are incorporated herein by reference.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

The invention generally relates to Monte Carlo simulations. More particularly, the invention relates to means and methods (2) Description of the Related Art In the related art, various other logic systems or truth tables have been disclosed. But, the prior art lacks the efficiency of the presently disclosed embodiments.

BRIEF SUMMARY OF THE INVENTION

The present invention overcomes shortfalls in the related art by presenting an unobvious and unique combinations, configurations and use of methods, systems and means reducing the time and computational costs traditionally associated with testing, manipulation and analysis of data in computer architectures.

Disclosed embodiments overcome the shortfalls in the related art by presenting a notation that allows for the encoding of both syntactic and semantic information into a two bit vector notation within associated with a semantic node in a semantic network. Disclosed embodiments also overcome shortfalls in the art by encoding the property each feature assumes in recursive predicate analysis.

BRIEF DESCRIPTION OF THE DRAWINGS

FIG. 6 depicts a disclosed system of a futures contract market These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Under Patents are patents filed with the USPTO.

Under the heading References is the academic literature specifically referenced in the application and is essential to the underlying invention.

Under the heading Further Reading is the academic literature relating to other academic work on this area of logic, added to assist patent searches and validate the mathematical claims of novelty. It is the mathematical properties of the four valued logics that have to be to correctly represent in implementations of the semantic network described Prof. by Sheldon Klein.

PATENTS

U.S. Pat. No. 5,692,233 by Garman, Nov. 25, 1997, Integrated system and method for analyzing derivative securities

REFERENCES

Chriss, Neil and Ira Kawaller. (1996). *Black-Scholes and Beyong: Option Pricing Models*. McGraw-Hill.

Englemore, R. and Tony Morgan, (1988). *Blackboard Systems*. New York. Addisson Wesley Publishers.

Kleene, S., (1951) "Representation Of Events In Nerve Nets And Finite Automata". Rand Memorandum RM-704. December.

Kleene, S., (1952). *Introduction to Metamathematics*. North Holland.

Kleene, S. and Richard Vesley, (1965). *The Foundations Of Intuitionistic Mathematics Especially In Relation To Recursive Functions*. North-Holland.

Kleene, S., (1967). *Mathematical Logic*. John Wiley. New York.

Kleene, S., (1973). "Realizability: A Retrospective Survey". *Cambridge Summer School in Mathematical Logic*. Edited by Mathias, R. and H. Rogers. p.95-112.

Kleene, S., (1981). "The Theory of Recursive Functions, Approaching Its Centennial". Bulletin of the American Mathematical Society. Vol. 5, Number 1, July 1981.

Klein, S., Stephen Lieman and Gary Lindstrom, (1966). "DISEMINER: A Distributional Semantics Inference Maker". Carnegie Mellon University Tech Report #1719.

Klein, S., John Aeschlimann, Matthew Appelbaum, David Balsiger, Elizabeth Curtis, Mark Foster, David Kalish, Ying-Da Lee and Lynee Price., (1976). FORWARD: The History of MESSY. University of Wisconsin Technical Report #272.

Klein, S., John Aeschlimann, Matthew Appelbaum, David Balsiger, Elizabeth Curtis, Mark Foster, David Kalish, Ying-Da Lee and Lynee Price. (1976) "Simulation D'Hypotheses Emises Par Propp & Levi-Strauss en Utilisant un Systeme de Simulation Meta-Symbolique". Informatique et Sciences Humaines. N. 28 Mars.

Klein, S. (1981). "Culture, Mysticism and Social Structure and the Calculation of Behavior". University of Wisconsin Technical Report #462.

Klein, S. (1988). "Reply to S. D. Siemens' critique of S. Klein's 'Analogy and Mysticism and the Structure of Culture (Klein 1983)'. Current Anthropology 29. P. 478-483.

Klein, S. (2002). "The Analogical Foundations of Creativity in Language, Culture & the Arts: the Upper Paleolithic to 2100 CE". Language, Vision & Music, edited by Paul McKevitt, Mulvihill & Nuallin. John Benjamin, pp. 347-371.

Midmore, R. (2014). "An interpretation of Sheldon Klein's Four Valued Analogical Transformational Operator". University of Wisconsin Tech Report #1801.

Steedman, M., (1992). "Categorial Grammar". University of Pennsylvania Department of Computer and Information Science Technical Report No. MS-CIS-92-52.

Yngve, V., (1996). *From Grammar to Science: New Foundations for General Linguistics*. Amsterdam.

FURTHER READING

Brouwer, E., (1981). *Brouwer's Cambridge Lecture on Intuitionism*. Edited by D. van Dalen.

Dubarle, D., (1977). *Logos et Formalisation Du Langage*. Paris. Dubarle, D., (1989). "Essai sur la generalisation naturelle de la logique usuelle (premier memoire)" Mathematiques et sciences humaines, vol. 107. p. 17-73.

Halton, J., (1968). "A Retrospective and Prospective Survey Of The Monte Carlo Method". University of Wisconin Computer Science Tech Report #13. February 1968.

Herdan, G. (1966). *The Advanced Theory of Language as Choice or Chance*. Spring-Verlag.

Lukasiewicz, J. (1955). *Aristotle's Syllogistic From the Standpoint of Modern Formal Logic*. 2nd edition. Oxford.

Piaget, J., (1952). "Essai sur les transformations des operations logiques. Les 256 operations ternaires de la logique bivalente". Paris Piaget, J., (1953). *Logic and Psychology*. Manchester University Press.

Reichenbach, H., (1949). *The Theory of Probability*. Los Angeles. (Proofed by Stephen Kleene)

Troelstra, A. S., (1999). "From Constructivism to Computer Science". Theoretical Computer Science, num. 211, 1999 p. 233-252.

Turing, Alan, (1947). "Lecture To The London Mathematical Society on 20 Feb. 1947". Unpublished Manuscript. In Alan Turing: His work and Impact. Edited by S. Cooper and Jan Leeuwen. 2012.

Turing, Alan, (1954). "Solvable and Unsolvable Problems". *Science News*, no. 31, p. 7-23

All the above references and U.S. patents and applications are incorporated herein by reference. Aspects of the invention can be modified, if necessary, to employ the systems, functions and concepts of the various patents and applications described above to provide yet further embodiments of the invention.

REFERENCE NUMBERS

Figure 1:
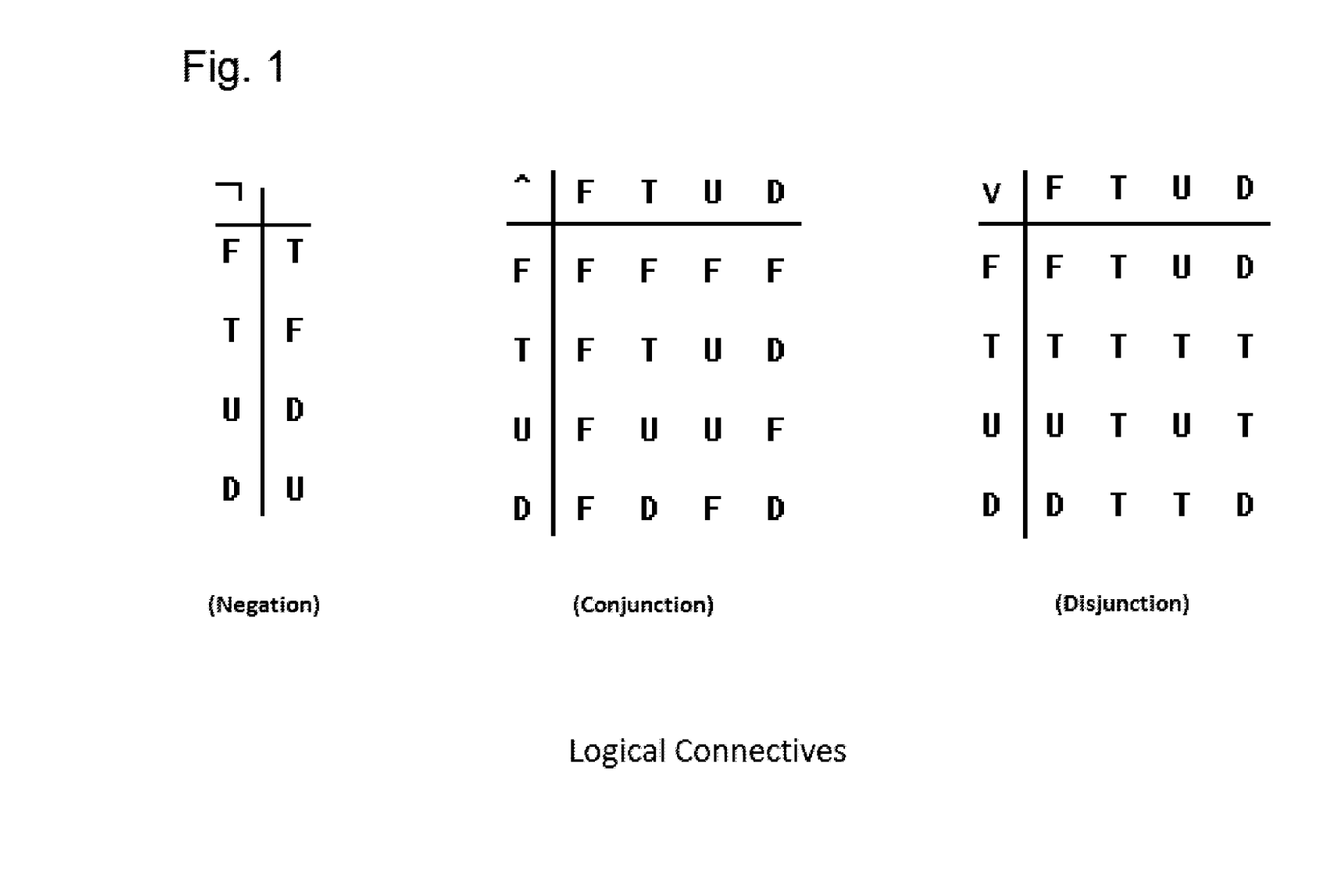
FIG. 1 depicts a disclosed logic

100 non transitory machine readable medium sometimes containing machine readable instructions
200 a general or specialized processor
300 memory, sometimes non volatile
410 database of one or more semantic networks
420 database of vector arrays
430 database of logical connectives
440 database of grammar phrase structure implementations
450 database of system reports
500 semantic network
510 objects
520 relations
600 runtime stack and heap
700 system clock
800 top down/bottom up parser
900 a contract market for futures or other assets
910 a risk engine or risk analysis system for screening orders
920 a flow of information between the contract market 900 and a direct market access participant 930
930 a direct market access participant
940 a risk engine or risk analysis for the direct market access automated trading system between the contract market 900 and the direct market access participant 930
950 risk analysis for the direct market access and the clients of the direct market access
960 a flow of information between 930 and swap dealers 970
970 swap dealers
980 swap dealer risk analysis engine
990 communication of information between swap dealers 970, sometimes occurring in OTC or over the counter transactions
1000 market A
1001 market B
1002 market C
1010 a market participant, Alpha
1020 values mapped to an array by Alpha
1022 explanation of encoding
1023 asset Z
1030 data from market C for asset Z
1032 encoding into the four value logic and showing how numbers are mapped
1040 encoding of conditional tests for asset Z
1042 encoding of the conditional test for asset Z Referring to FIG. 1, a diagram for the basic binary operators and negation, ignoring monotonic arguments for negation, for a four valued logic is described. These operators are used in proving the completeness for a family of logics. These logics can be derived from a variety of different arguments. From considerations of Boolean groupings on the truth values, a pre-ordering of the truth tables into a lattice structure, or from set theoretic and recursive definitions. All are constructed to preserve some of the primary axioms in classical logic. By modeling the recursive values the truth values assume explicitly in the semantic network simplifies the testing of conditionals and the quantification of variables. The undefined value, the default value for growth to the system, allows for the dynamic benign encoding into the network, a logic property attributable to many Kleene logics. The fourth property allows for the proper quantification and binding of variables for the elimination of the effects of the newer truth values for subsequent steps in the calculation. It also provides the possibility for the introduction of an intuitionistic acceptable "terium non datur" for decision procedures for modeling Markov processes into the logic.

By encoding properties with a specific bit into the bit vector the linear scaling may be maintained. This system is a departure from prior art in complier design for creating symbol tables, testing of features and aids extended stack compiler implementations.

In first column of FIG. 1, the logical not sign is shown as ¬, in the second column of FIG. 1 the AND operator is shown as ^, in the third column of FIG. 1 the OR operator is shown as V. The first column shows the values before application of the not operator. For example, in the first row of the first column, the value of F is shown before application of the not operator and T is shown as a result.

In the second column, a OR operator takes one value from the first column and one value from the first row and shows the result of the logical operator where the column value and row value intersect. In the third column a AND operator is applied in a similar manner as in the second column. For example, in the third column, at the first row and selecting the last element, at the first column in selecting the second element D and F are shown and result in a value of D.

Figure 2:
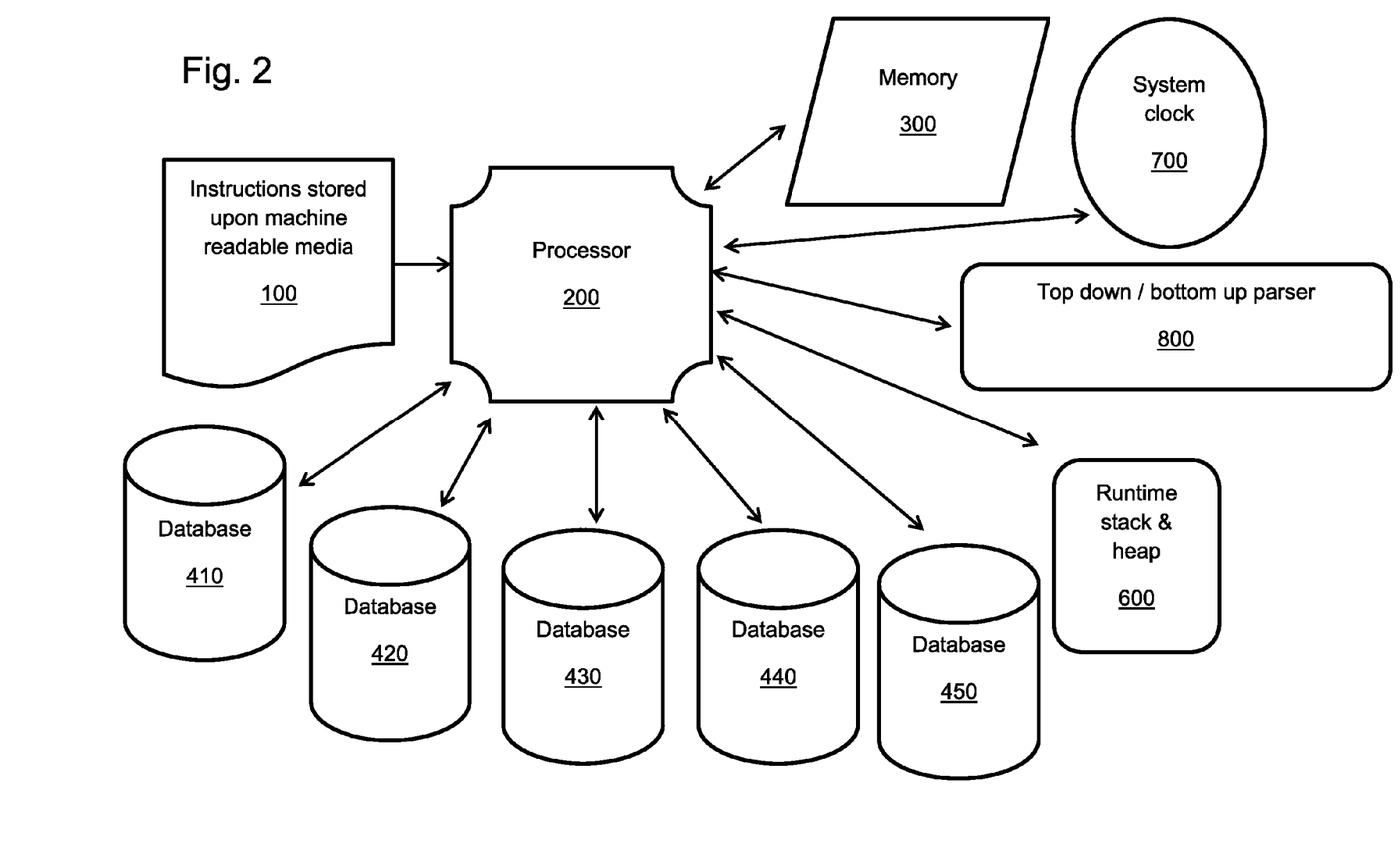
FIG. 2 depicts a machine implementation

Referring to FIG. 2, a machine implementation is shown using a machine readable, non-transitory media 100, the media 100 having machine readable instructions sent to a general or specialized processor 200. The processor 200 may be in communication with memory 300, a plurality of databases and other components, such as a network, user interfaces and other implements. The plurality of databases may include a database 410 of one or more semantic networks, such as the network system of FIG. 3, a database 420 of vector arrays the arrays may be associated with each semantic node or other network component, a database 430 of logical connectives, such as the connectives of FIG. 1, a database 440 of grammar phrase structure implementations, such as the and a database of other disclosed components FIG. 5 also depicts a system clock 700, top down/bottom up parser 800 and runtime stack and heap 600.

Figure 3:
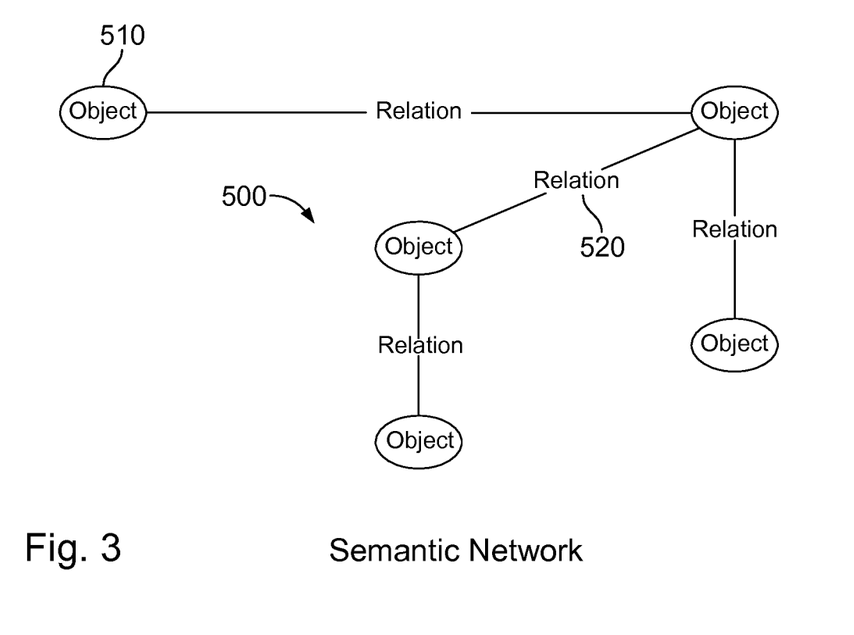
FIG. 3 depicts graphical representation of a semantic network

Referring to FIG. 3, a graphical representation of a semantic network 500 is shown with objects 510 and relations 520, with all objects and relations being nodes in memory or in a database.

Figure 4:
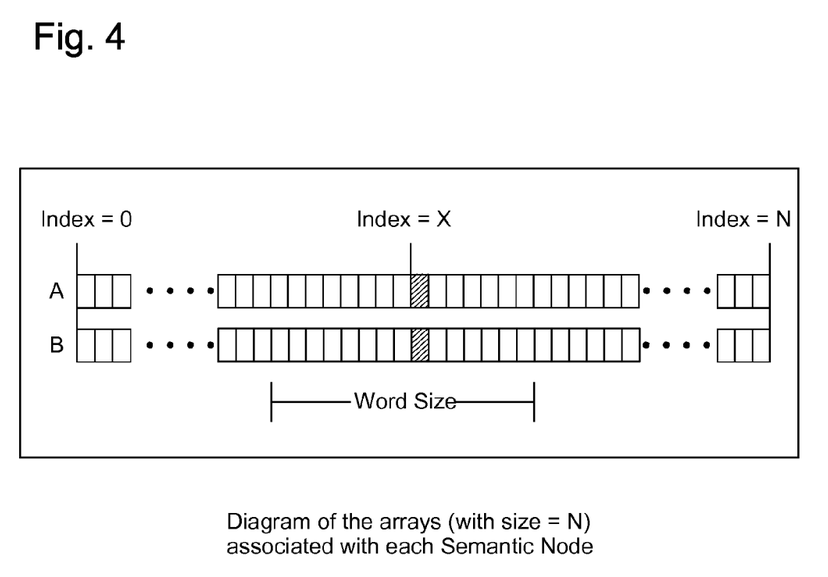
FIG. 4 depicts the assignment of a property to a particular index within array

FIG. 4 depicts a graphical representation of the two bit vector array associated with the semantic node in memory. FIG. 4 further shows the assignment of the truth value across the two arrays, with X being a specific index into the array. The word size in the figure is a consequence of word size limitations in computer architecture. This causes a chunking factor for implementations of the array.

Figure 5:
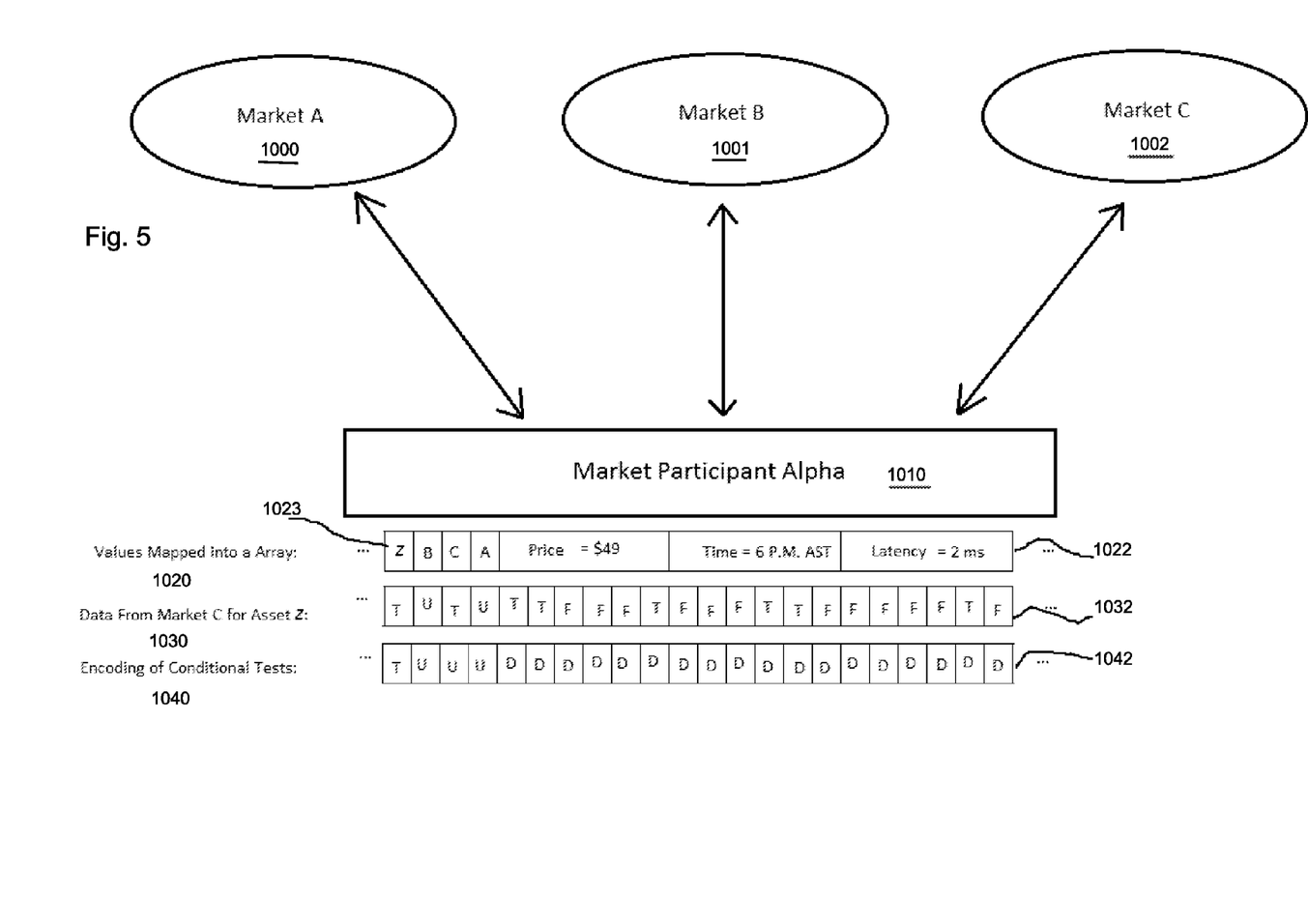
FIG. 5 depicts a disclosed conditional testing of market data for Monte Carlo simulation and syntactic pattern matching

Referring to FIG. 5, a system is disclosed wherein a market participant tests conditionals to attempt to take advantage of price discrepancies between markets or other risk analysis in pre-ordering. Disclosed systems also pertain to post order analysis as well.

Referring to 1040 encoding of conditional tests to isolate the asset class Z from all three markets, A 1000, B 1001 and C 1002 or other markets, this can be used to partition computational time in a parallel environment for the market participant by designating specific processor(s) to perform risk analysis on the subject asset to their specific risk profile.

The displaced information pertains to data from market C. Conditional tests and filters are shown as executed by market participant Alpha. Test may be used to filter asset classes, risk and for resource allocation.

Figure 6:
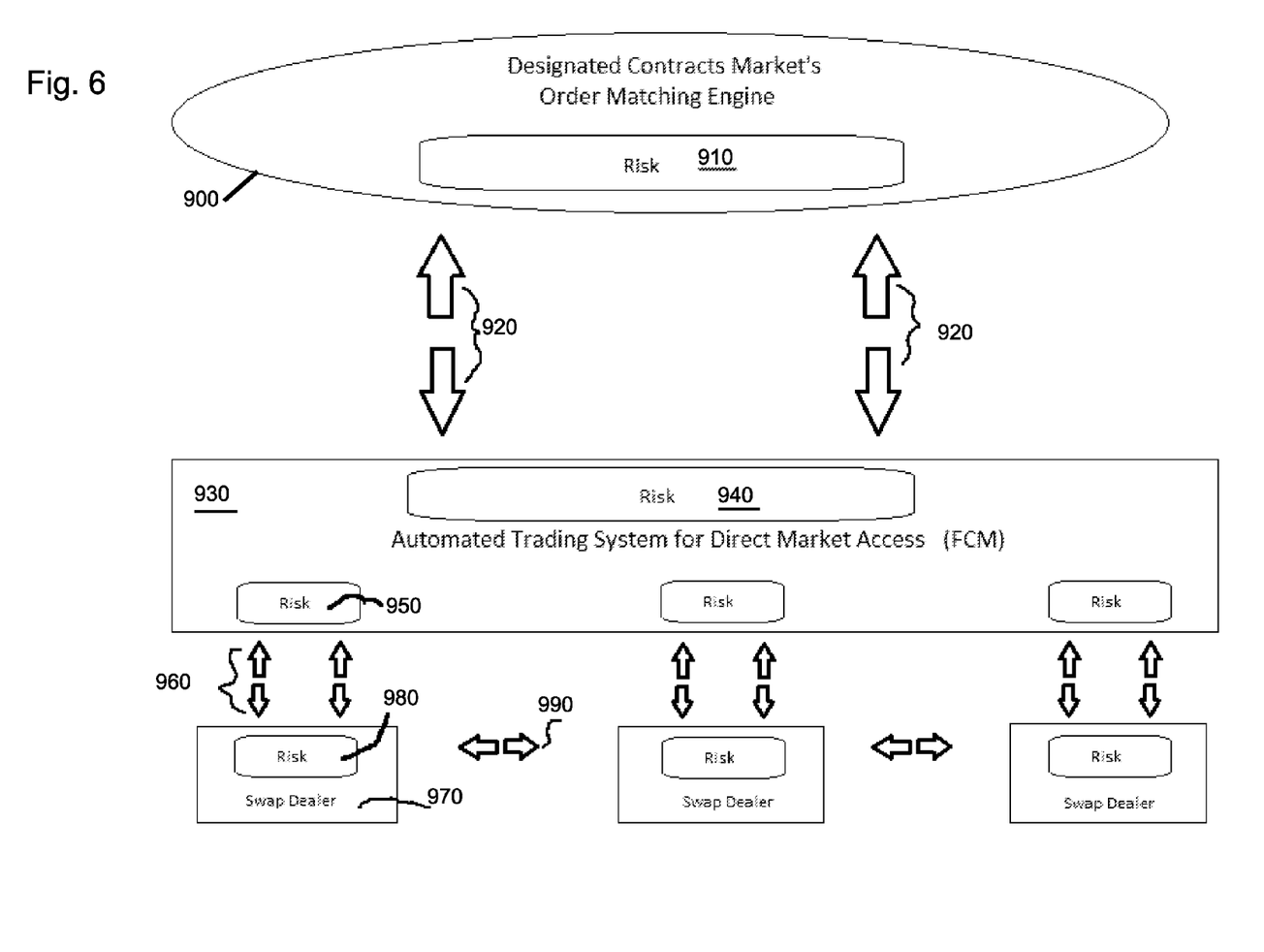

Referring to FIG. 6 a system and order matching engine is disclosed wherein a risk analysis is performed prior to execution of orders within the disclosed system. FIG. 6 may be considered a diagram of the major and minor participants of a futures contract, derivatives market or other market.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Disclosed embodiments include the following Items:

Item 1. A machine implemented method of executing a four-valued logic to model financial instruments:

using symbols comprising (F, T, U, D) to represent the values false, true, undefined, and defined, mapped into a two vector dynamic array; the values further mapped into indexes within the two vector dynamic arrays and stored as nodes within a semantic network;

for F, T, U, D, defined into set theory, such as { } for undefined, {T} for true, {F} for false, { } for undefined and {T, F} for defined, these values are interpreted as properties {P} for T and, {¬P} false, { } for undefined and {P, ¬P} for defined, which are the properties used for testing the conditionals and quantifying variables for successive recursive steps in the predicate calculus;

c) defining a logic with a negation, ignoring monotonic argumentations, with the following binary connectives: for the logical AND (^), NOT (¬); and logical OR (V) connectives as follows used to prove the completeness of the logics:
¬F is T
¬T is F
¬U is D
¬D is U;
d) for the ^ connective
^ FTUD
F FFFF
T FTUD
U FUUF
D FDFD;
e) for the V connective
V FTUD
F FTUD
T TTTT U UTUT
D DTTD;
    f) optimizing short term memory maximizing long term storage by the linear encoding of syntactic and semantic information into the semantic network;
    g) in a parallel context optimizing short term memory to maximize long term storage becomes optimizing communication and memory between different knowledge sources (processes) and
    h) using defined and undefined to help separate asset classes in the simulation.

Item 2. The method of item 1 further comprising using the use of a phrase structure rewrite rule associated with a node within the semantic network for the testing and passing of the rewrite rule.

Item 3. The method of item 2 implementing a top/down, bottom/up parser capable of a plurality of syntactic parses of a grammar.

Item 4. The method of item 3 using a system clock, runtime stack and heap, a processor and a database of rewrite rules, a database of the semantic network and a database of syntactic and semantic information.

Item 5. A system for executing a four-valued logic to optimize short term memory and to maximize long term storage, the system comprising:
    machine readable instructions stored upon a nonvolatile computer readable medium, a central processing unit, a runtime stack and heap, semantic network, top down/bottom up parser, a system clock, database with historical economic information;
    the system using a Boolean encoding comprising (F, T, U, D) to represent the values false, true, undefined, and defined, mapped into a two vector dynamic array; the values further mapped into indexes within the two vector dynamic arrays and associated with nodes in a semantic network;
    for $\{F, T, U, D\}$ defined into set theory, such as $\{\ \}$ for undefined, $\{T\}$ for true, $\{F\}$ for false, and $\{T,F\}$ for defined, these values are interpreted as properties $\{P\}$ for T, $\{\neg P\}$ for false, $\{\ \}$ for undefined and $\{P, \neg P\}$ for defined, which are the properties used for the testing of conditionals and quantifying of variables in the predicate calculus;
    d) the system defining a logic with a negation with the following binary connectives: for the logical AND ($\wedge$), NOT ($\neg$); and logical OR (V) connectives as follows used to prove the completeness of the logics:
$\neg$ F is T
$\neg$ T is F
$\neg$ U is D
$\neg$ D is U;
e) for the $\wedge$ connective
$\wedge$ FTUD
F FFFF
T FTUD
U FUUF
D FDFD;
f) for the V connective
V FTUD
F FTUD
T TTTT
U UTUT
D DTTD;
    g) the system optimizing short term memory maximizing long term storage by the linear encoding of the information into the semantic network;
    h) the system integrating memory in a parallel context to optimize communication and memory between different knowledge sources, (processes).

Item 6. The system of item 5 further comprising using the use of a phrase structure rewrite rule associated with a node within the semantic network for the testing and passing of the rewrite rule, the word size of the system imposing a chunking factor in the testing of conditionals in theoretic time O(C).

Item 7. The system of item 5 further comprising a database of vector arrays, with each array associated with each semantic node, a database of the semantic network and a database of a grammar phrase structure implementations and a database of logical connectives.

Item 8. The system of item 7 implementing a top/down, bottom/up parser capable of a plurality of syntactic parses of a grammar to provide syntactic pattern matching abilities for modeling complex buy and sell orders for a variety of financial types in order matching engines.

Item 9. The system of item 7 implementing a risk management system for the dynamic modeling of Monte Carlo simulations, with the use of both historical and real-time data, in hedging risk for financial institutions when interacting between different market participants.

Item 10. The system of item 7 implementing a risk management system for the dynamic modeling of Monte Carlo simulation models, with the use of both historical and real-time data, in hedging risk for insurance institutions when interacting between different market participants.

Item 11. The system of item 10 further comprising real time inputs from financial markets to provide traders with accurate updates on the movements of financial assets in the market and allow efficient communication between market participants.

Item 12. The system of item 11 further comprising a self-compiling computerized monitoring system for the design and implementation of complex hybrid human-computer financial strategies.

What is claimed is:

1. A machine implemented method of executing four-valued logic in a semantic network to model financial instruments, the method comprising:
    defining a logic system having a NOT logical connective denoted as "$\neg$" an AND logical connective denoted as "$\wedge$," and an OR logical connective denoted as "$\vee$," wherein false values are represented with an "F" symbol, true values are represented by a "T" symbol, undefined values are represented by a "U" symbol, and defined values are represented by a "D" symbol, such that for a property P false values are in a set $\{\neg P\}$, true values are in a set $\{P\}$, undefined values are in a set $\{\ \}$, defined values are in a set $\{P, \neg P\}$, wherein said logic system is proven complete and w-consistent by a set of statements comprising:
    $\neg$ F is T, $\neg$ T is F, $\neg$ U is D, $\neg$ D is U;
    F$\wedge$F is F, F$\wedge$T is F, F$\wedge$U is F, F$\wedge$D is F;
    T$\wedge$F is F, T$\wedge$T is T, T$\wedge$U is U, T$\wedge$D is D;
    U$\wedge$F is F, U$\wedge$T is U, U$\wedge$U is U, U$\wedge$D is F;
    D$\wedge$F is F, D$\wedge$T is D, D$\wedge$U is F, D$\wedge$D is D;
    F$\vee$F is F, F$\vee$T is T, F$\vee$U is U, F$\vee$D is D;
    T$\vee$F is T, T$\vee$T is T, T$\vee$U is T, T$\vee$D is T;
    U$\vee$F is U, U$\vee$T is T, U$\vee$U is U, U$\vee$D is T; and
    D$\vee$F is D, D$\vee$T is T, D$\vee$U is T, D$\vee$D is D;
    generating a semantic network representing digitally stored information, said semantic network comprising a plurality of object nodes and a plurality of relationships between said plurality of object nodes, by:
    providing a first vector and a second vector in digital memory for each of said plurality of object nodes, each of said first vector and said second vector being a dynamically allocated array having a plurality of index positions each with a size of one bit;

linearly encoding semantic information for an object node by storing two bits that together encode a false value, true value, undefined value, or defined value, a first bit of said two bits being stored at an index position within the first vector associated with the object node, and a second bit of said two bits being stored at the same index position within the second vector associated with the object node;

linearly encoding syntactic information associated with said plurality of relationships in said digital memory; and testing conditionals or quantifying variables in said semantic network during successive recursive steps in a predicate calculus using said logic system, the false values, true values, undefined values, and defined values in the semantic information associated with said plurality of object nodes, and the syntactic information associated with said plurality of relationships, wherein linear encoding of said semantic information and said syntactic information optimizes short term memory, maximizes long term storage, and optimizes communication and memory between different knowledge sources or processes and, wherein defined values and undefined values represent different asset classes of financial information in said semantic network.

2. The method of claim 1, further comprising applying a phrase structure rewrite rule on said plurality of object nodes in said semantic network.

3. The method of claim 2, further comprising implementing a top/down, bottom/up parser capable of a plurality of syntactic parses of a grammar.

4. The method of claim 3, wherein said top/down, bottom/up parser is coupled with a system clock, a runtime stack and heap, a processor, a database of rewrite rules, a database storing said semantic network, and a database storing said syntactic information and said semantic information.

5. A system for executing four-valued logic in a semantic network, the system comprising:

a computing device comprising a central processing unit, a runtime stack and heap, a top down/bottom up parser, and a system clock, and a database storing historical economic information;

a logic system defined in memory of said computing device, said logic system having a NOT logical connective denoted as "$\neg$," an AND logical connective denoted as "$\wedge$," and an OR logical connective denoted as "$\vee$," wherein false values are represented with an "F" symbol, true values are represented by a "T" symbol, undefined values are represented by a "U" symbol, and defined values are represented by a "D" symbol, such that for a property P false values are in a set $\{\neg P\}$, true values are in a set $\{P\}$, undefined values are in a set $\{\ \}$, and defined values are in a set $\{P, \neg P\}$, wherein said logic system is proven complete and w-consistent by a set of statements comprising:

$\neg$ F is T, $\neg$ T is F, $\neg$ U is D, $\neg$ D is U;

F$\wedge$ F is F, F$\wedge$ T is F, F$\wedge$ U is F, F$\wedge$ D is F;

T$\wedge$ F is F, T$\wedge$ T is T, T$\wedge$ U is U, T$\wedge$ D is D;

U$\wedge$ F is F, U$\wedge$ T is U, U$\wedge$ U is U, U$\wedge$ D is F;

D$\wedge$ F is F, D$\wedge$ T is D, D$\wedge$ U is F, D$\wedge$ D is D;

F$\vee$ F is F, F$\vee$ T is T, F$\vee$ U is U, F$\vee$ D is D;

T$\vee$ F is T, T$\vee$ T is T, T$\vee$ U is T, T$\vee$ D is T;

U$\vee$ F is U, U$\vee$ T is T, U$\vee$ U is U, U$\vee$ D is T; and

D$\vee$ F is D, D$\vee$ T is T, D$\vee$ U is T, D$\vee$ D is D;

a non-transitory computer readable medium storing machine readable instructions for causing said computing device to perform the steps of generating a semantic network representing digitally stored information, said semantic network comprising a plurality of object nodes and a plurality of relationships between said plurality of object nodes, by:

providing a first vector and a second vector in digital memory for each of said plurality of object nodes, each of said first vector and said second vector being a dynamically allocated array having a plurality of index positions each with a size of one bit;

linearly encoding semantic information for an object node by storing two bits that together encode a false value, true value, undefined value, or defined value, a first bit of said two bits being stored at an index position within the first vector associated with the object node, and a second bit of said two bits being stored at the same index position within the second vector associated with the object node;

linearly encoding syntactic information associated with said plurality of relationships in said digital memory; and testing of conditionals or quantifying variables in said semantic network during successive recursive steps in a predicate calculus using said logic system, the false values, true values, undefined values, and defined values in the semantic information associated with said plurality of object nodes, and the syntactic information associated with said plurality of relationships, wherein linear encoding of said semantic information and said syntactic information optimizes short term memory, maximizes long term storage, and optimizes communication and memory between different knowledge sources or processes.

6. The system of claim 5, said machine readable instructions further comprising applying a phrase structure rewrite rule on said plurality of object nodes in said semantic network for testing and passing of a rewrite rule, a word size of the system imposing a chunking factor in testing of conditionals in theoretic time O(C).

7. The system of claim 5, wherein said first vector and said second vector for each of said plurality of object nodes is stored in a database of vectors, said plurality of object nodes and said plurality of relationships is stored in a semantic network database, a plurality of grammar phrase structure implementations is stored in a grammar database, and logical connectives of said logic system are stored in a logical connectives database.

8. The system of claim 7, wherein said top/down, bottom/up parser is configured to perform a plurality of syntactic parses of a grammar to provide syntactic pattern matching abilities for modeling complex financial buy and sell orders in an order matching engine.

9. The system of claim 7, wherein said machine readable instructions further comprising instructions for dynamic modeling of Monte Carlo simulation models within a risk management system using both historical and real-time data, in hedging risk for financial institutions when interacting between different market participants.

10. The system of claim 7, wherein said machine readable instructions further comprise instructions for dynamic modeling of Monte Carlo simulation models within a risk management system using both historical and real-time data, in hedging risk for insurance institutions when interacting between different market participants.

11. The system of claim 10, wherein said machine readable instructions further comprise instructions for receiving real time inputs from financial markets to provide traders with accurate updates on the movements of financial assets in the market and allow efficient communication between market participants.

12. The system of claim 11, wherein said machine readable instructions further comprise instructions for operating a self-compiling computerized monitoring system for the design and implementation of complex case analogies for hybrid human-computer financial strategies.

* * * * *